(12) United States Patent
Honda

(10) Patent No.: US 8,380,660 B2
(45) Date of Patent: Feb. 19, 2013

(54) DATABASE SYSTEM, DATABASE UPDATE METHOD, DATABASE, AND DATABASE UPDATE PROGRAM

(75) Inventor: Kazutoshi Honda, Tokyo (JP)

(73) Assignee: NEC Corporation, Tokyo (JP)

( * ) Notice: Subject to any disclaimer, the term of this patent is extended or adjusted under 35 U.S.C. 154(b) by 175 days.

(21) Appl. No.: 12/922,051

(22) PCT Filed: Mar. 31, 2009

(86) PCT No.: PCT/JP2009/057033
§ 371 (c)(1),
(2), (4) Date: Sep. 10, 2010

(87) PCT Pub. No.: WO2009/123342
PCT Pub. Date: Oct. 8, 2009

(65) Prior Publication Data
US 2011/0004583 A1      Jan. 6, 2011

(30) Foreign Application Priority Data

Apr. 4, 2008   (JP) ................................. 2008-097870

(51) Int. Cl.
*G06F 7/00*      (2006.01)
*G06F 17/00*     (2006.01)
(52) U.S. Cl. ......... 707/609; 707/704; 711/147; 711/153
(58) Field of Classification Search .................. 707/609, 707/704, E17.005, 999.008; 711/147, 148, 711/153, E12.001, E12.066, 173
See application file for complete search history.

(56) References Cited

U.S. PATENT DOCUMENTS

| | | | | |
|---|---|---|---|---|
| 5,548,728 A * | 8/1996 | Danknick | ..................... | 711/147 |
| 5,617,537 A * | 4/1997 | Yamada et al. | ............... | 711/147 |
| 5,914,730 A * | 6/1999 | Santos et al. | .................. | 711/118 |
| 6,055,545 A * | 4/2000 | Yazaki et al. | ................. | 711/153 |
| 6,463,439 B1 * | 10/2002 | Dahlberg | ...................... | 707/624 |
| 6,810,464 B1 * | 10/2004 | Sipple et al. | .................. | 711/119 |
| 7,895,399 B2 * | 2/2011 | Tomita et al. | ................. | 711/137 |
| 2003/0079085 A1 * | 4/2003 | Ang | .............................. | 711/122 |
| 2003/0158871 A1 * | 8/2003 | Fomenko | ...................... | 707/203 |
| 2006/0044871 A1 * | 3/2006 | Tanikawa et al. | ......... | 365/185.09 |
| 2006/0212747 A1 * | 9/2006 | Okamoto et al. | ................ | 714/6 |
| 2007/0245105 A1 * | 10/2007 | Suzuki et al. | ................. | 711/162 |
| 2008/0320243 A1 * | 12/2008 | Mitsuzuka et al. | ........... | 711/153 |

FOREIGN PATENT DOCUMENTS

| | | |
|---|---|---|
| JP | 10-31604 A | 2/1996 |
| JP | 2007249503 A | 9/2007 |

OTHER PUBLICATIONS

Jim Crammond—"A Garbage Collection Algorithm for Shared Memory Parallel Processors"—International Journal of Parallel Programming, vol. 17, No. 6, 1988—Received Jan. 1989; revised May 1989—(pp. 497-522).*

Michela Becchi and Patrick Crowley—"Dynamic Thread Assignment on Heterogeneous Multiprocessor Architectures"—CF'06, May 3-5, 2006, Ischia, Italy.—Proceedings of the 3rd conference on Computing frontiers—Copyright 2006 ACM 1-59593-302-06/06/00—(pp. 29-40).*

International Search Report for PCT/JP2009/057033 mailed Jun. 16, 2009.

* cited by examiner

*Primary Examiner* — Anh Ly

(57) ABSTRACT

A database system, which updates data by an application program, includes data storage for storing a master data and a shared memory area. The shared memory area includes: a first area, which loads the master data and to which an application program is allowed only to refer; and a second area, which stores a difference data generated when the application program updates the master data in the first area, and which the application program is allowed to refer to and update. The database system is robust against variation of application programs and environments.

14 Claims, 21 Drawing Sheets

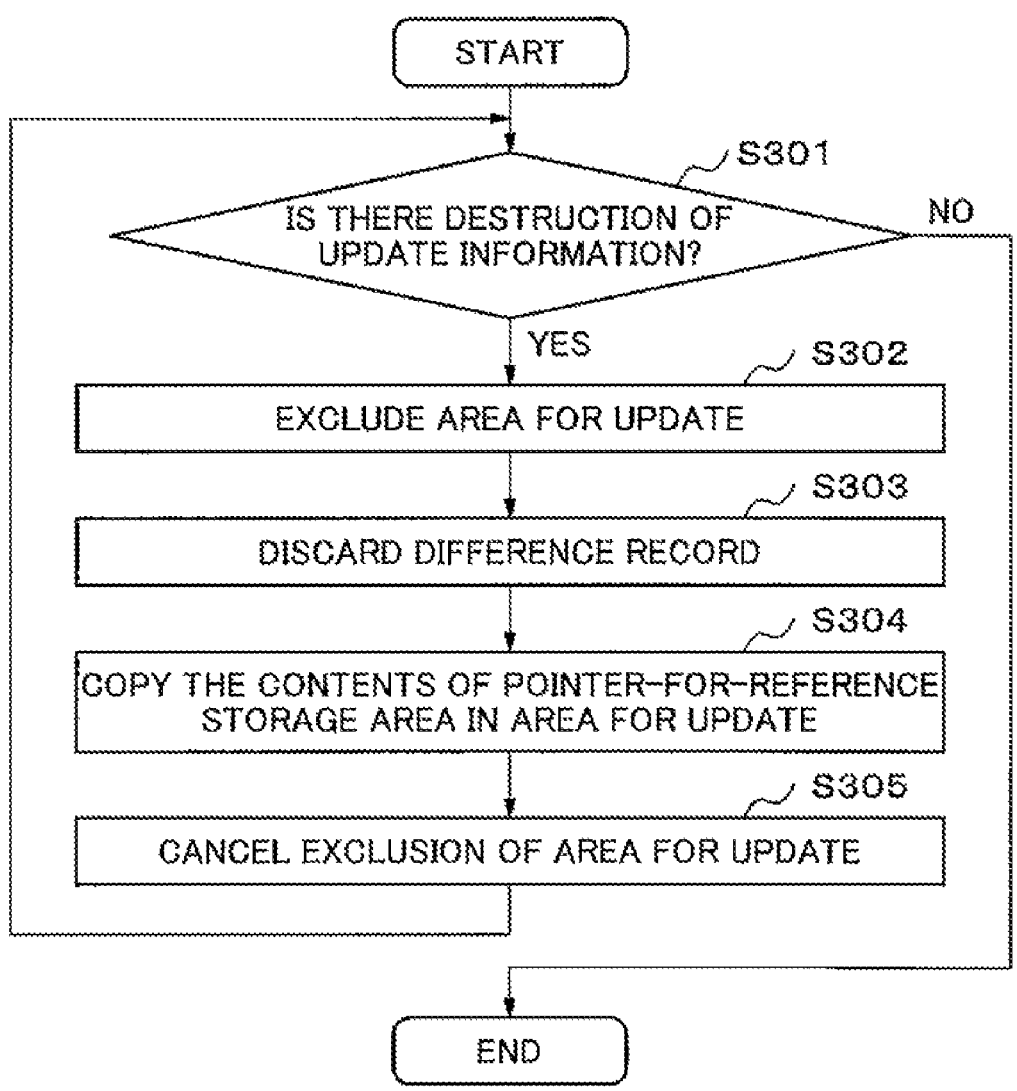

DATABASE SYSTEM, DATABASE UPDATE METHOD, DATABASE, AND DATABASE UPDATE PROGRAM

This application is the National Phase of PCT/JP2009/057033, filed Mar. 31, 2009, which claims priority based on Japanese application Japanese Patent Application No. 2008-097870, filed on Apr. 4, 2008, the disclosure of which is incorporated herein in its entirety.

TECHNICAL FIELD

The present invention relates to a database, in which a user application program updates a data area placed on a shared memory, a database system, a database update method and a database update program.

BACKGROUND ART

FIG. 13 shows a memory database system, in which a user application program directly updates a data area placed on a shared memory. In this database system, in the case where there is a defect in the user application program, there is a problem that, when the user application program updates data, the data area on the shared memory might be destroyed.

FIG. 14 shows a journal file system for the memory database system. In this system, when data destruction occurs, data is restored according to the following procedure. That is, (1) eliminating the destroyed data on the memory, (2) reloading the master data from the disk apparatus, and (3) roll forwarding an update data from the journal file, which holds and manages the metadata.

However, the procedures (2) and (3) require reading data from the disk apparatus. Usually, time necessary for reading and writing, when accessing the disk apparatus, is large compared with the case when accessing a memory, then, when the memory destruction occurs, services are suspended for a long time. Also, the cost required for recovery is large.

As a system, equipped with a function to prevent the data destruction caused by the user application program, there is a memory database system of a client/server method. A system of the client/server method, as shown in FIG. 15, includes a server daemon. Access from the user application program to the data is inevitably performed through the server daemon. Only the server daemon accesses the shared memory, and the user application program does not directly access the shared memory. As a result, the user application program does not destroy data on the shared memory.

As another method, a method used for CVS (Concurrent Versions System) is known. The CVS is a version management system, by which a plurality of people handle a file simultaneously. A configuration of the CVS is shown in FIG. 16. When a user updates a master data (a master file, in this case), first, (4) copying whole of the master file from an area, called a repository, into a local area, and next, (5) updating the copied master file.

After that, (6) the contents of the update are reflected to the master file in a lump. The user himself/herself cannot update directly the master file. As a result, the user does not destroy the master file.

FIG. 17 shows a data update method disclosed by patent document 1. From an application process, the shared memory of the database system is read-only. A memory for update is provided in block units (64 KB) or page units (4 to 8 KB) for each application process. When updating the data, first, (7) a relevant block of the shared memory is copied to the memory for update, (8) the data on the memory for update is updated, and then, (9) a manager process copies contents on the memory for update into the shared memory. (10) The application process does not directly access the master data. As a result, the user does not destroy the master file.

Patent document 1: Japanese Patent Application Laid-Open No. 1998-031604

DISCLOSURE OF INVENTION

Technical Problem

A subject of the present invention is to provide a database, which is robust against variation of application programs and environments.

In the client/server method, when the user application program accesses data, interprocess communication between the user application program and the server daemon is always necessary. For this reason, due to degradation of data update performance caused by overhead of the interprocess communication, data access cost becomes higher compared with the case of directly accessing the shared memory, and thus, transaction performance is deteriorated.

This point becomes a serious problem in the memory database, for which high transaction performance is required.

In addition, in the CVS method, the master data needs to be entirely copied, before starting the data update processing. Further, in the method shown in patent document 1, a part of the master data needs to be copied into the other area, in a block unit or in a page unit.

The processing for copying data between the memories consumes a CPU resource in proportion to a size of copying. For this reason, in these methods for copying the master data at each time of stating the data update processing, there is a problem that the CPU resource is deprived by the copy processing, and thus, the transaction performance is aggravated.

Also, in these methods, copies of the master data by the number of the processes, in which the data is updated, is generated. For this reason, there is also a problem that a memory resource necessary for the system increases, too.

An object of the present invention is to provide a memory database, a memory database system and an update method of a memory database, which solve the problem mentioned above. An object of the present invention is to provide a memory database, which can prevent data destruction by a user, and minimizes degradation of data access performance and consumption of a CPU resource and of a memory resource.

Solution to Problem

A database system of the present invention is a database system for updating data by an application program, including: data storage means for storing a master data; and a shared memory area. The share memory area includes: a first area, in which the master data is loaded, and to which the application program is allowed only to refer; and a second area, which stores a difference data generated when the application program updates the master data in the first area, and which the application program is allowed to refer to and update.

A database update method of the present invention is a database update method for updating data by an application program, including: a step for updating a master data loaded in a first area, to which the application program is allowed only to refer, by the application program and for generating a difference data; a step for storing the difference data, which is generated when the application program updates the master data, in a second area, which the application program is allowed to refer to and update; a step for reflecting the difference data into the master data; and a step for eliminating the difference data.

A database of the present invention is a database for updating data by an application program, including: a first area, in which a master data is loaded, and to which the application program is allowed only to refer; and a second area, which stores a difference data generated when the application program updates the master data in the first area, and which the application program is allowed to refer to and update.

A database update program of the present invention is a database update program for updating data loaded in a database, which makes the database execute: a step for updating a master data loaded in a first area, to which the program is allowed only to referred, and for generating a difference; a step for storing the generated difference data in a second area, which the program is allowed to refer to and update; a step for reflecting the difference data into the master data; and a step for eliminating the difference data.

Advantageous Effects of Invention

According to the present invention, because a user application program cannot access an area for reference, which stores a master data, even when there is a defect in the user application program, the master data is not destroyed.

BRIEF DESCRIPTION OF DRAWINGS

FIG. 21 A flow chart showing a data restoration processing in the memory database according to this exemplary embodiment.

DESCRIPTION OF EMBODIMENTS

Hereinafter, the preferred embodiment according to the present invention will be described with reference to the drawings.

Meanwhile, individual processing or operation in a memory database of this exemplary embodiment shown below is realized by a processing, means and a function, which are executed in a computer by instructions of a program (software). The program sends an instruction to each component of the computer and makes them perform a predetermined processing and a function described below. That is, individual processing and means in the memory database of this exemplary embodiment are realized by concrete means, in which the program and the computer cooperate with each other.

Meanwhile, all or a part of the program is provided, for example, by a magnetic disk, an optical disc, a semiconductor memory or any other computer-readable recording medium. The program read from the recording medium is installed in the computer and then executed. Also, the program may be carried out after being loaded into the computer via a communication line not through the recording medium. Further, a program may be executed directly through the communication line.

Figure 1:
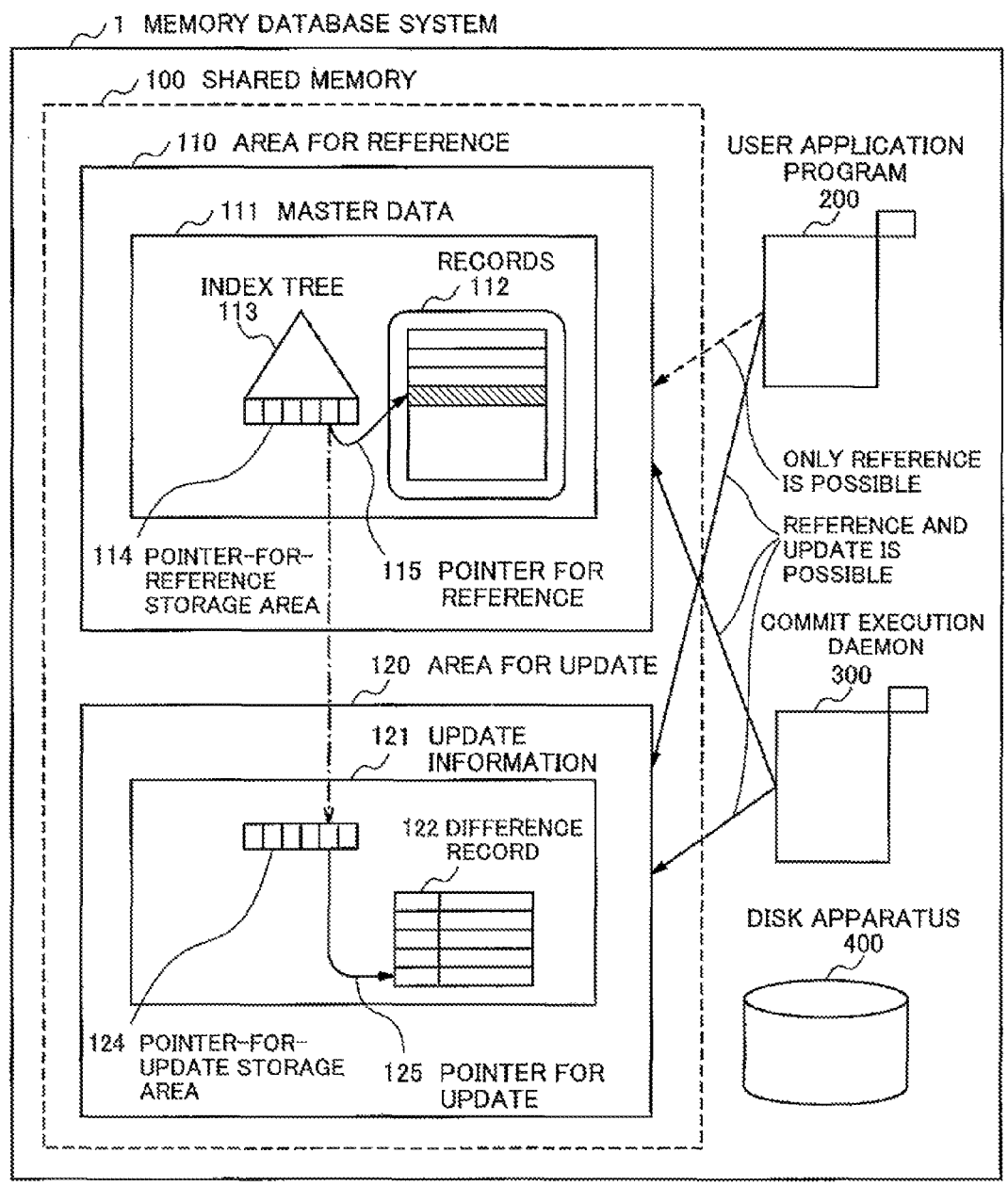
FIG. 1 A system configuration diagram showing one exemplary embodiment of a memory database system according to the present invention.

FIG. 1 is a block diagram showing an exemplary embodiment of a configuration of a memory database system according to the present invention. The memory database system 1 of this exemplary embodiment includes an information processing apparatus such as a personal computer and a workstation. Specifically, the memory database system 1 of this exemplary embodiment includes a shared memory 100, which stores data of a database, a user application program 200, which a user prepared originally, a commit execution daemon 300 and a disk apparatus 400, which stores a master data. The commit execution daemon 300 may start on a daemon server, which is not illustrated, to carry out the processing described below.

The shared memory 100 is divided into an area for reference 110 as a first area and an area for update 120 as a second area.

In the area for reference 110, the master data 111 is stored.

The master data 111 is read from the disk apparatus 400 at the time of start-up of the operation of the memory database system 1.

The master data 111 includes a record 112 as a main data and an index tree 113 as an index for reference.

The index tree 113 has a tree structure, which is used in order to rapidly search for record. The index tree 113 has a pointer-for-reference storage area 114 in a leaf portion corresponding to the tail end.

The pointer-for-reference storage area 114 stores numerical values of a pointer for reference 115, which points to the respective corresponding records 112. As an index for update corresponding to the pointer-for-reference storage area 114, a pointer-for-update storage area 124 is provided in an area for update 120. The pointer-for-reference storage area 114 stores a link to the pointer-for-update storage area 124.

The following access restriction is set to the area for reference 110. That is, from the user application program 200, only a reference is possible, but an update is not allowed. Furthermore, from the commit execution daemon 300, the reference and the update are possible.

Update information 121 is stored in the area for update 120.

At a timing when the user application program 200 tries to update the master data 111, the update information 121 is created.

The update information 121 includes a difference record 122 of difference between before and after the update, and the pointer-for-update storage area 124 that stores the index for update.

At a timing when the master data 111 is read into the area for reference 110, a content of the pointer-for-reference storage area 114 is automatically copied into the pointer-for-update storage area 124, and a link from the pointer-for-reference storage area 114 is provided.

Accordingly, in the initial state, the pointer-for-update storage area 124 stores a numerical value of a pointer for update 125, which points to the corresponding record 112 on the master data 111.

After that, when the user application program 200 tries to update the master data 111 and the difference record 122 is created, the numerical value of the pointer-for-update storage area 124 is updated, so that the pointer for update 125 points to the difference record 122.

An access restriction is set for the area for update 120, and from the user application program 200 and from the commit execution daemon 300, the reference and the update is possible.

The user application program 200 is prepared originally by a user who uses the memory database system 1. The user application program 200 has a function to refer to the master data 111 placed in the area for reference 110. Furthermore, the user application program 200 has a function to create the difference record 122 when updating the master data 111, to exclude the area for update 120, after that, to store the created difference record 122 in the area for update 120, and to change the pointer for update 125, so that the difference record 122 is pointed to.

Furthermore, the user application program 200 has a function to carry out a commit processing by transmitting a commit request to the commit execution daemon 300 after the update of the data.

The commit execution daemon 300 operates in the memory database system 1. When the commit request from the user application program 200 is received, the commit execution daemon 300 excludes the area for reference 110 and the area for update 120. After that, the commit execution daemon 300 has a function to reflect the difference record 122, stored in the area for update 120, in the master data 111, stored in the area for reference 110, and to change the pointer for update 125 so as all to point to the records 112 of the master data 111.

Next, operation of the above-mentioned memory database system 1 will be described with reference to FIGS. 2 to 12 and FIGS. 18 to 21.

Figure 18:
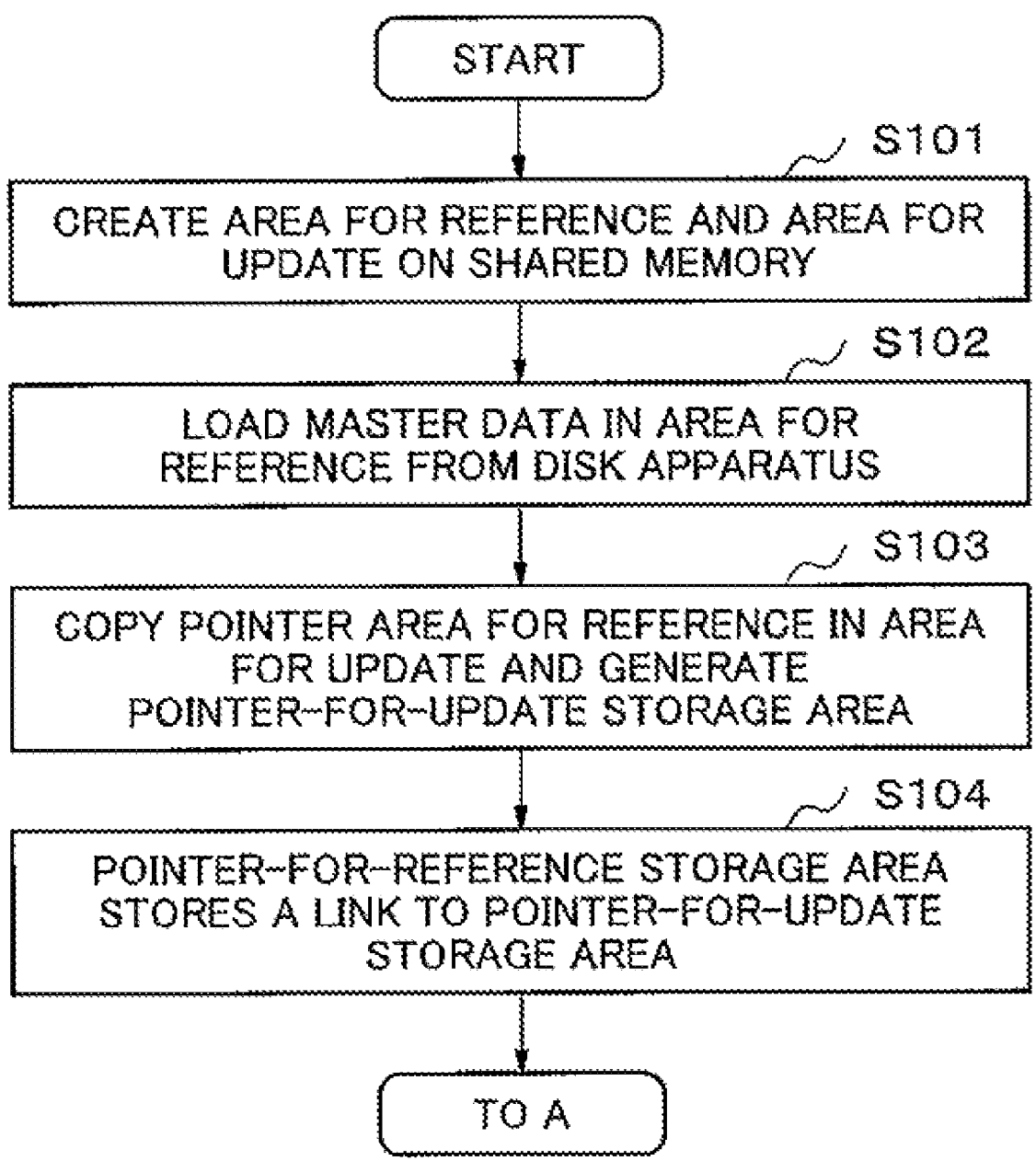
FIG. 18 A flow chart showing a processing at the time of start-up of the memory database system according to this exemplary embodiment.

Referring to FIG. 18, the shared memory 100 of the memory database system 1 is created according to the following procedure.

Figure 2:
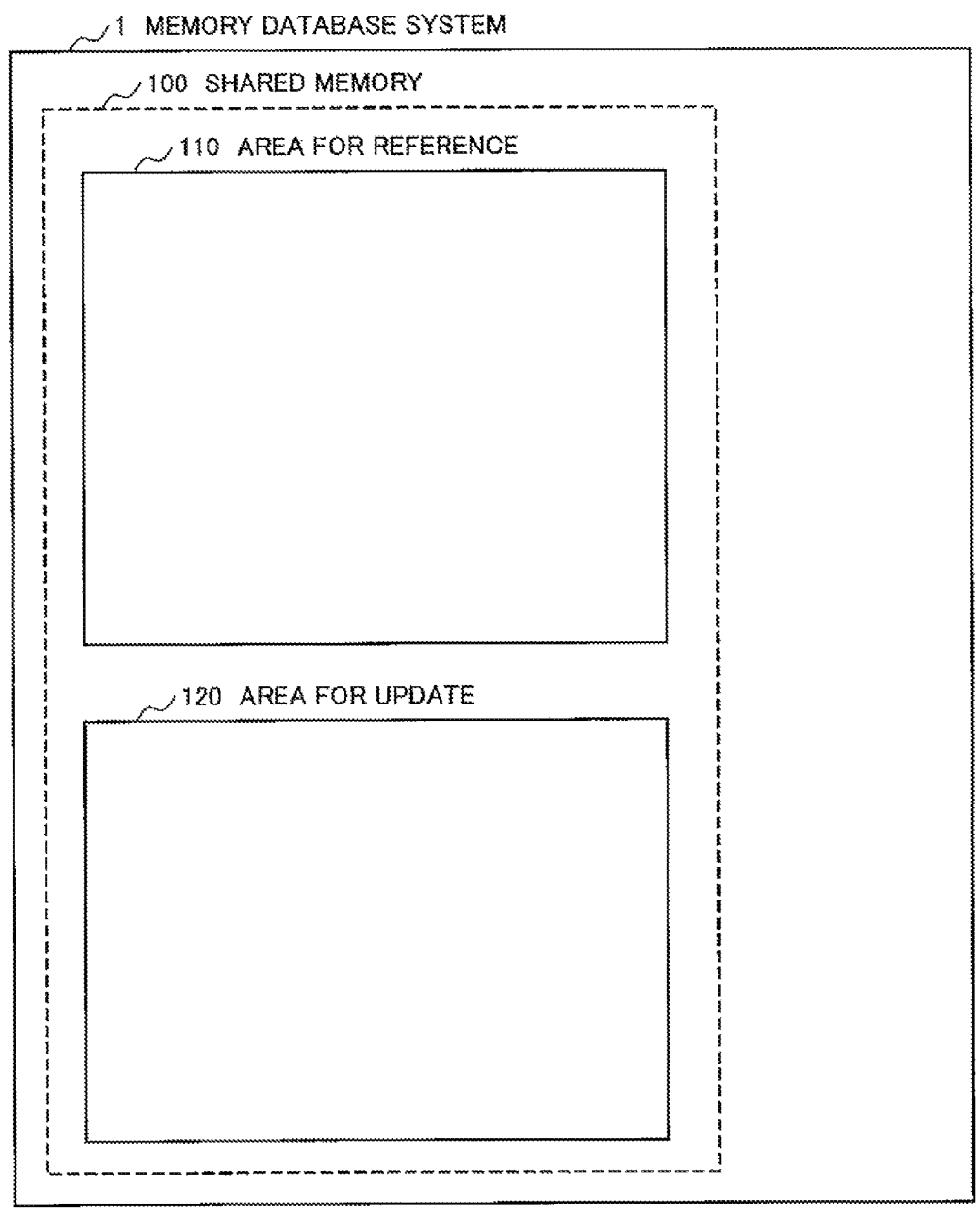
FIG. 2 A configuration diagram of a shared memory at the time of creating the shared memory according to this exemplary embodiment.

First, as shown in FIG. 2, the memory database system 1 creates an area for reference 110 and an area for update 120 on the shared memory 100 at the time of start-up (Step S101).

Figure 3:
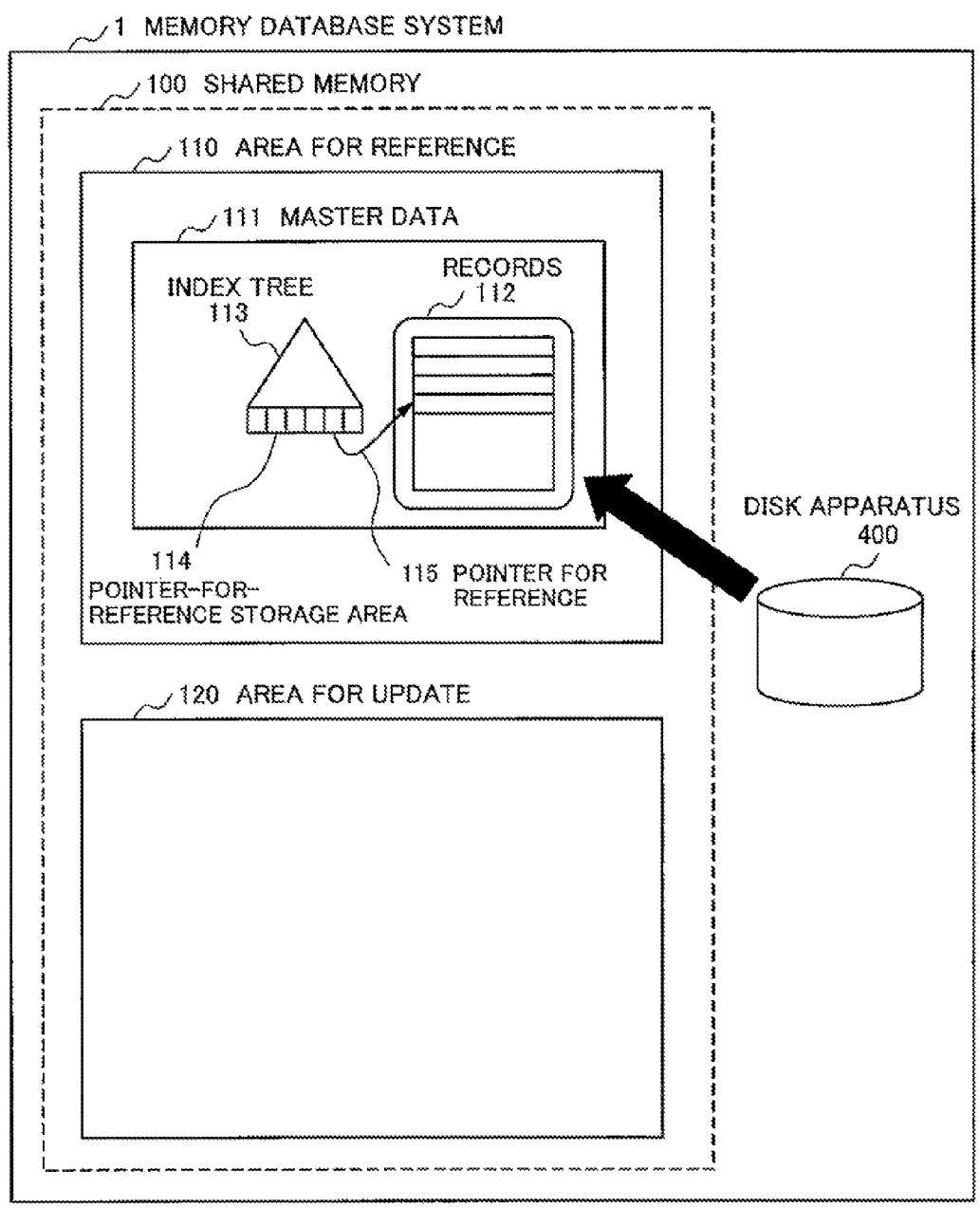
FIG. 3 A configuration diagram of a memory database system according to this exemplary embodiment at the time of loading a master data.

Next, as shown in FIG. 3, the memory database system 1 loads the master data 111 read from the disk apparatus 400 onto the area for reference 110 (Step S102). The master data 111 includes the records 112 as the main data and the index tree 113 as the index for reference. The index tree 113 has the pointer-for-reference storage area 114 in the leaf portion.

Figure 4:
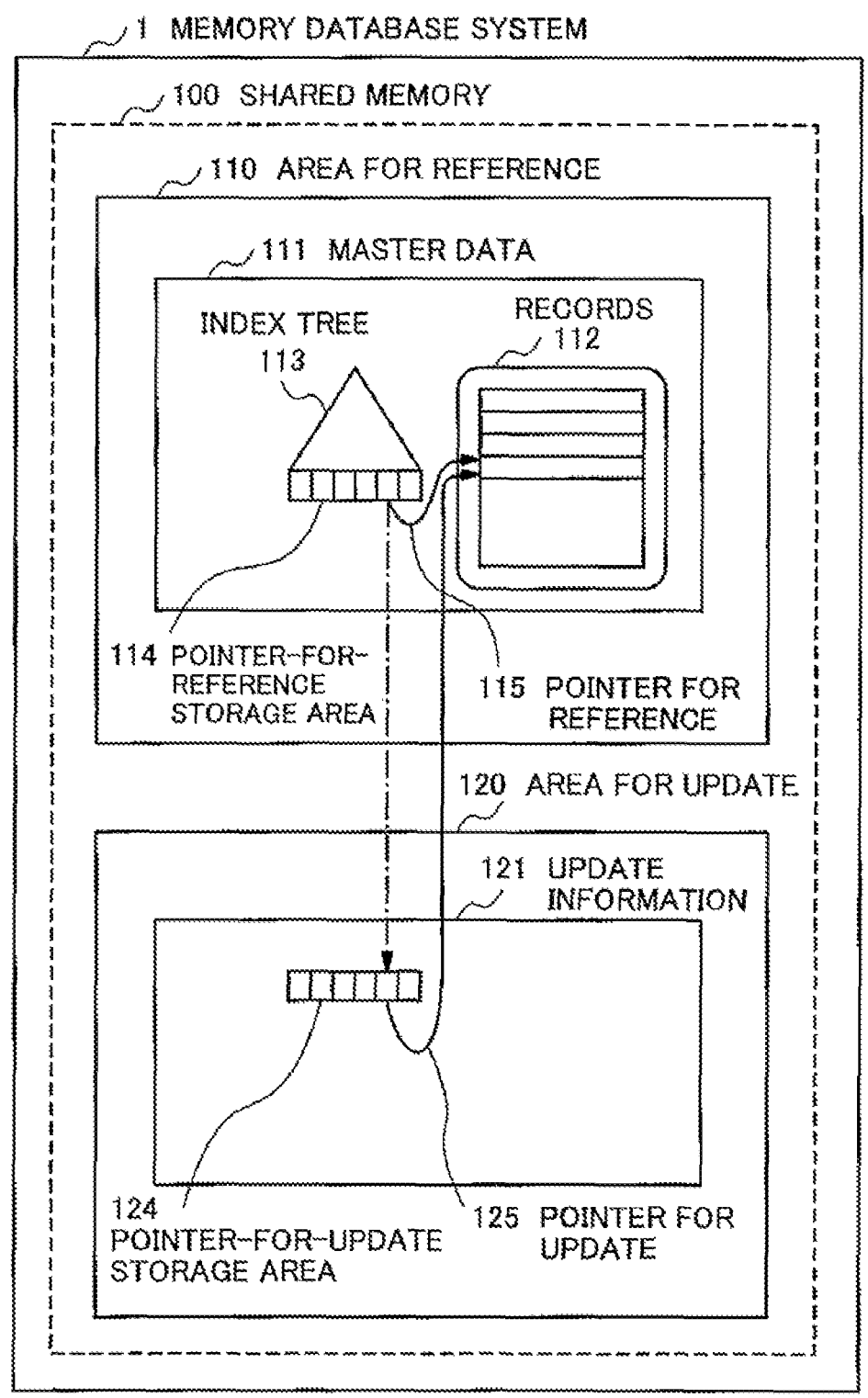
FIG. 4 A configuration diagram of the memory database system according to this exemplary embodiment at the time of configuring an index in an area for update.

Next, as shown in FIG. 4, the memory database system 1 copies the pointer-for-reference storage area 114 onto the area for update 120, and generates the pointer-for-update storage area 124 (Step S103).

The pointer-for-reference storage area 114 stores numerical values of the pointer for reference 115, which points to the corresponding records 112, and also stores a link to the pointer-for-update storage area 124 as an index for update provided in the area for update 120 (Step S104).

The pointer-for-update storage area 124 stores numerical values of the pointer for update 125, which points to the difference record 122 (FIG. 1).

However, in the initial state, the pointer for update 125 points to the same record as the pointer for reference 115 on the master data 111, as shown in FIG. 4.

Next, processing, in which the user application program 200 updates the master data 111 placed on the shared memory 100 will be described with reference to FIG. 19.

Figure 5:
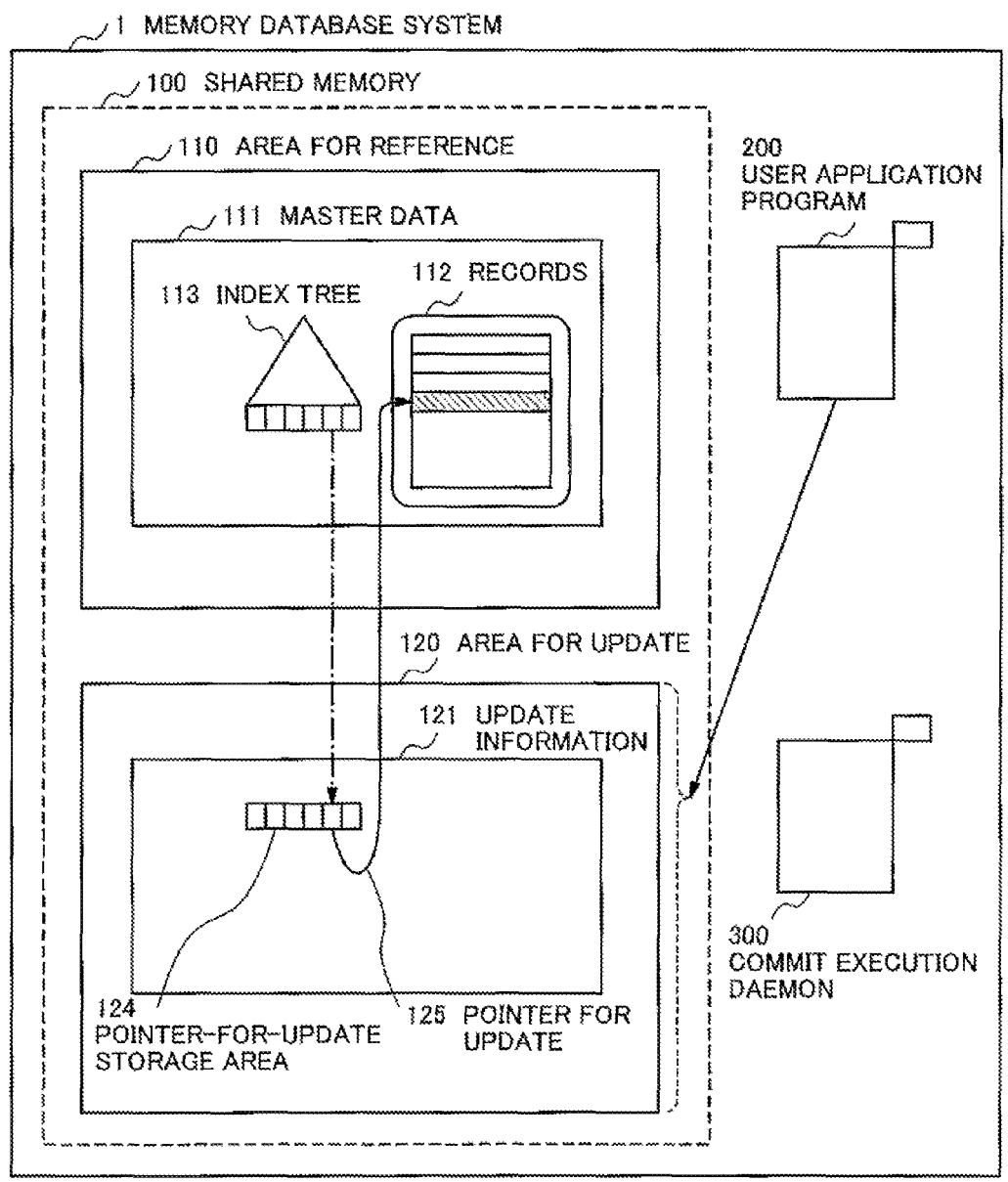
FIG. 5 A configuration diagram of the memory database system according to this exemplary embodiment in an early stage of generating difference data of the master data.
Figure 19:
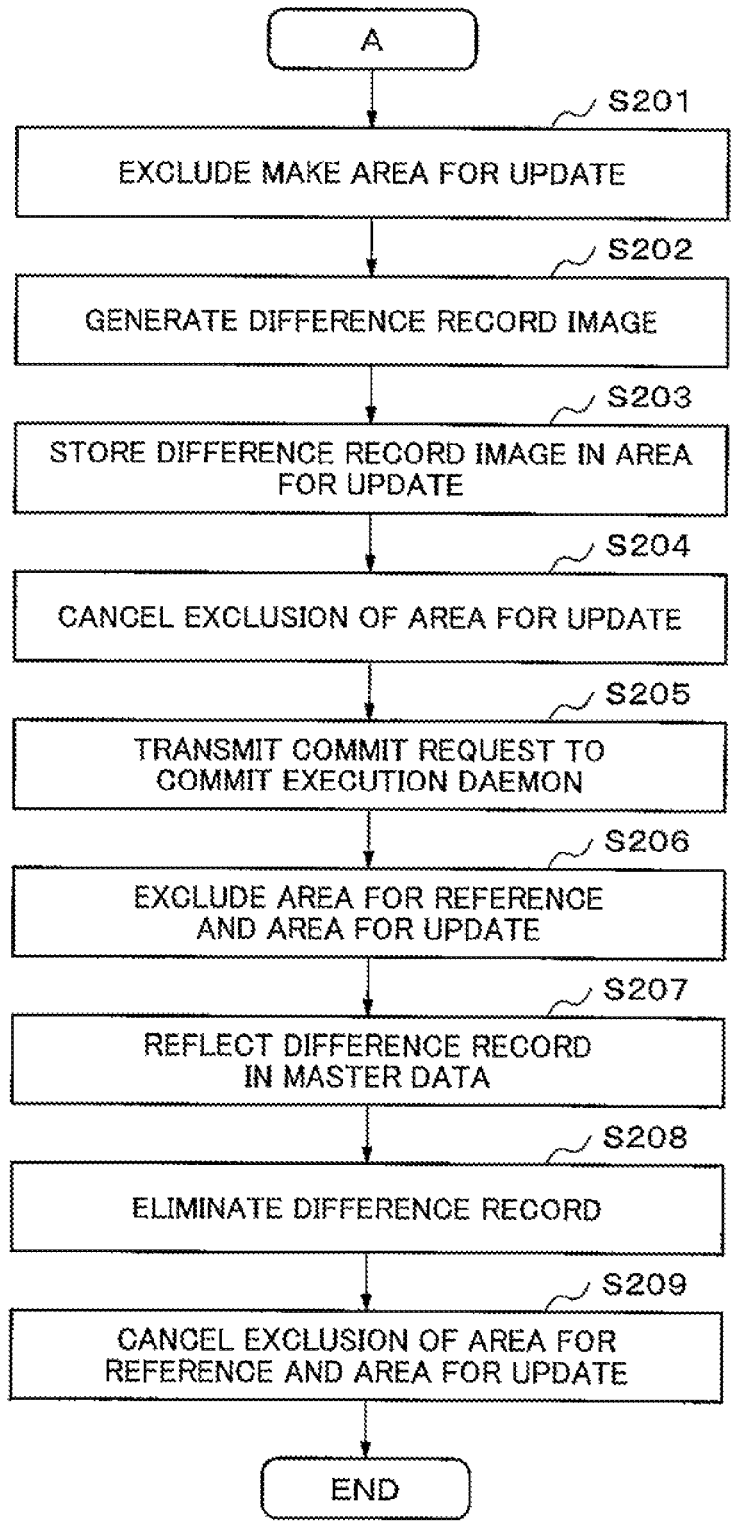
FIG. 19 A flow chart showing an update processing for data in the memory database according to this exemplary embodiment.

In FIG. 5 and FIG. 19, when the user application program 200 tries to update the records 112 of the master data 111, the user application program 200 excludes the area for update 120 (Step S201). As a result, other user application program or the commit execution daemon 300 cannot refer to the area for update 120. Next, by referring to the pointer for update 125 from the index tree 113, the user application program 200 identifies a position of a record image to be updated. In FIG. 5, a black-painted part of the records 112 indicates the position of the identified record image.

Figure 6:
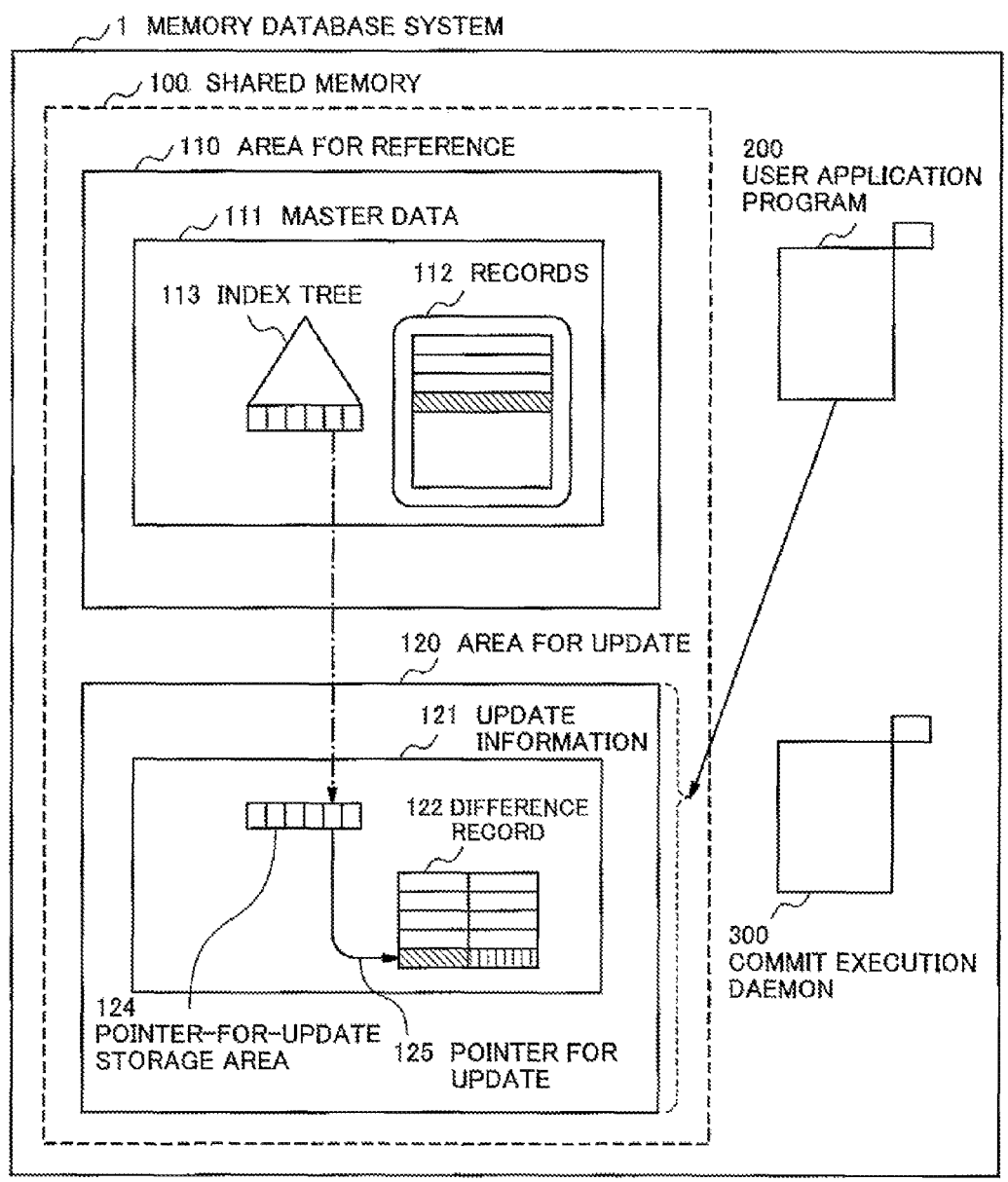
FIG. 6 A configuration diagram of the memory database system according to this exemplary embodiment in a latter stage of generating the difference data of the master data.

After that, the user application program 200 generates a difference record image 122, which is obtained from the record image before update, a position of which has been identified as above, and from the record image after update (Step S202), and stores it in the area for update 120, as shown in FIG. 6 (Step S203). Then, the user application program 200 rewrites the pointer-for-update storage area 124, so that the pointer for update 125 points to the difference record image 122.

After whole of the processing ends, the user application program 200 cancels the exclusion for the area for update 120 (Step S204).

Figure 7:
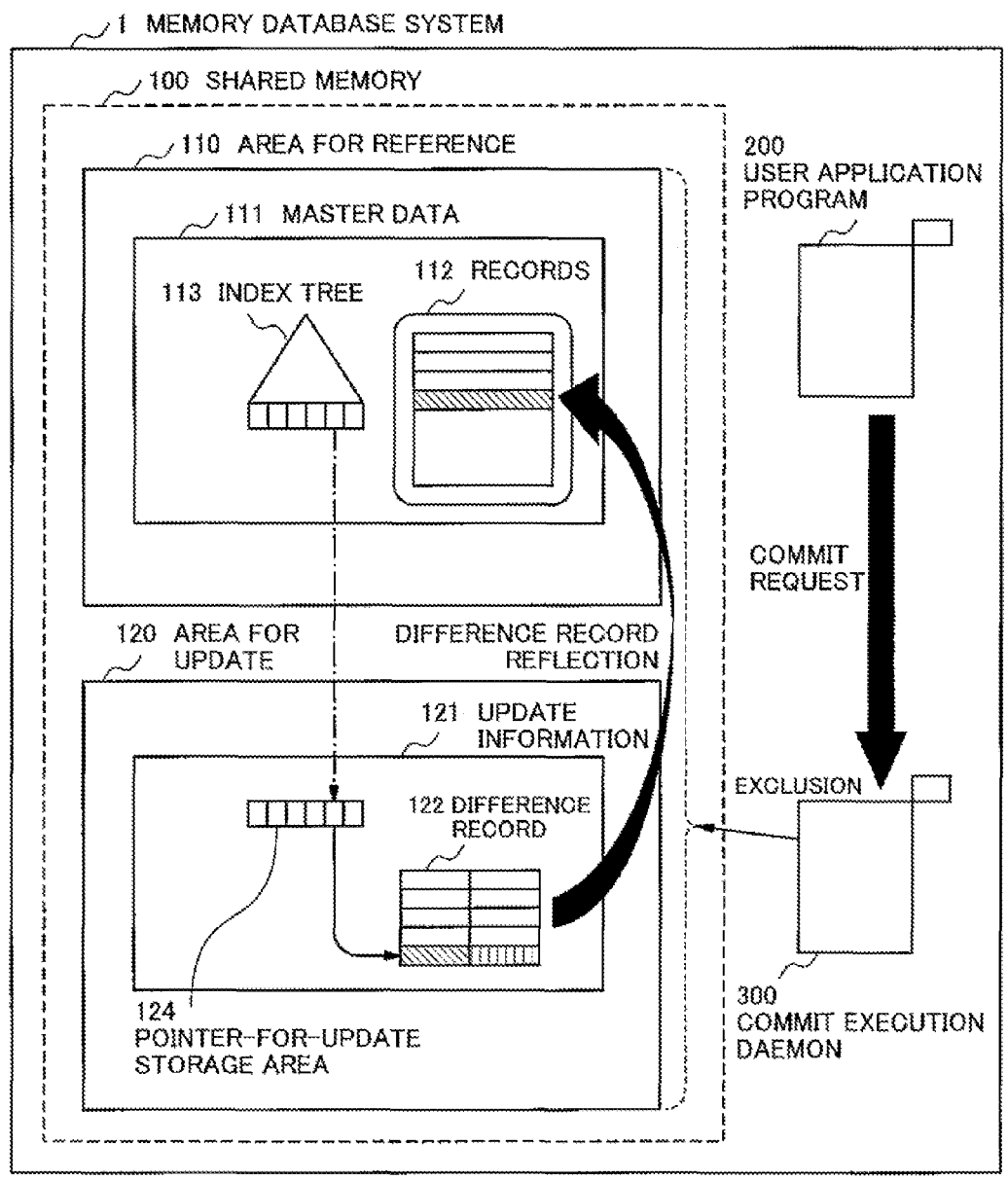
FIG. 7 A configuration diagram of the memory database system according to this exemplary embodiment in an early stage of updating the master data by the difference data.

After the update by the user application program 200 by the specified number of times (the number may be one or may be plural) ends, the update information 121 accumulated in the area for update 120 is reflected to the master data 111. That is, as shown in FIG. 7, the user application program 200 transmits a commit request to the commit execution daemon 300 using an interprocess communication (Step S205).

When a commit request is received, the commit execution daemon 300 first excludes the area for reference 110 and the area for update 120 (Step S206).

Next, the difference record 122 accumulated in the area for update 120 is reflected into the master data 111 of the area for reference 110 at the same time (Step S207).

Figure 8:
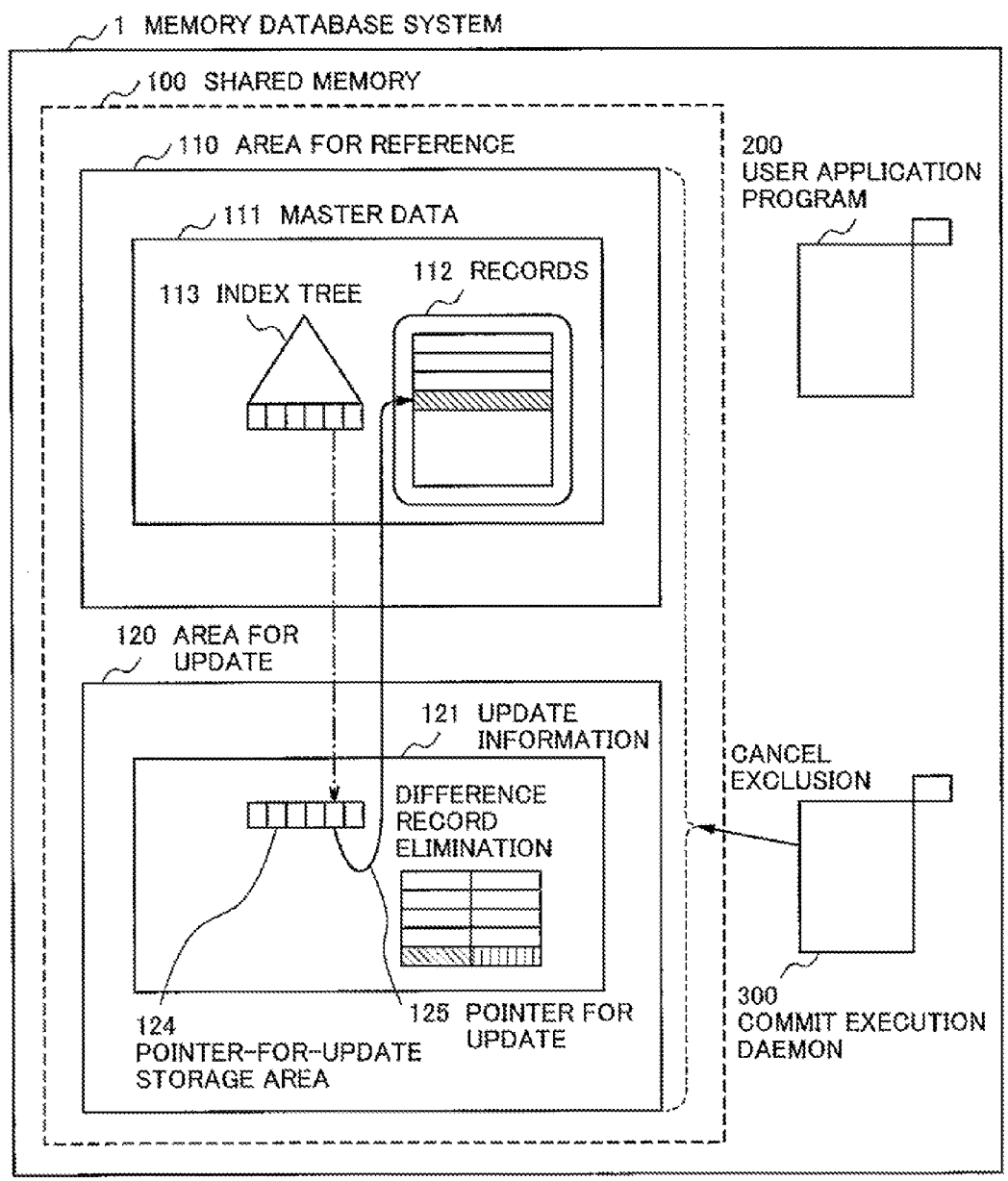
FIG. 8 A configuration diagram of the memory database system according to this exemplary embodiment in a latter stage of updating the master data by the difference data.

After rewriting the master data 111 with the difference record 122, as shown in FIG. 8, the difference record 122 is eliminated (Step S208), and the pointer-for-update storage area 124 is rewritten, so that the pointer for update 125, which pointed to the difference record 122, points to the corresponding record 112 on the master data 111.

After whole of the processing ends, the exclusion for the area for reference 110 and for the area for update 120 is cancelled (Step S209).

Figure 20:
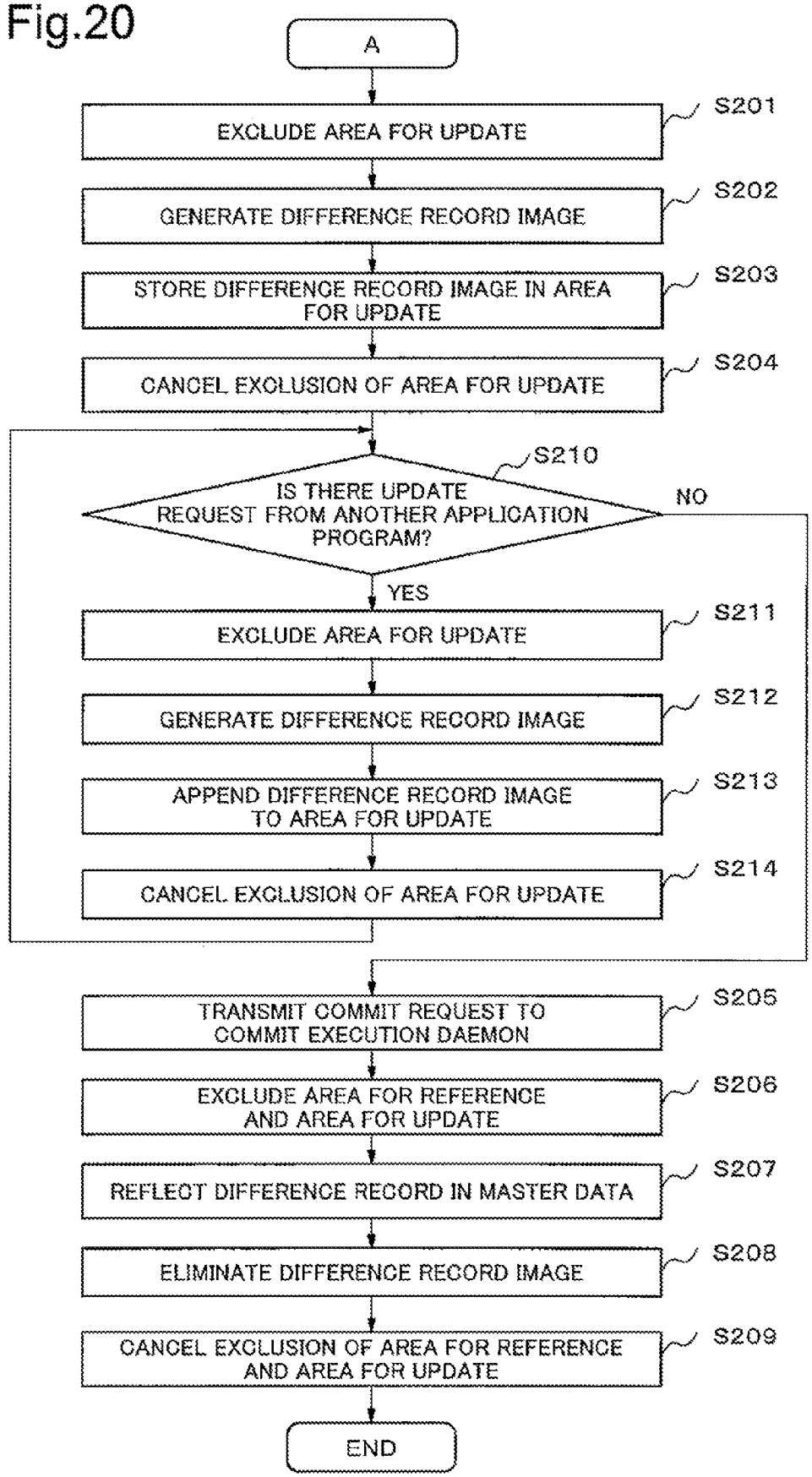
FIG. 20 A flow chart showing an update processing for data, when other application program issues an update request, in the memory database according to this exemplary embodiment.

Next, a method, by which a record updated by the user application program 200 is further updated by another user application program, will be described with reference to FIG. 20.

As shown in FIG. 6, it is assumed in the state that, by the user application program 200, the master data 111 is updated, the difference record 122 is stored in the area for update 120, and the pointer-for-update storage area 124 is rewritten so that the pointer for update 125 points to the difference record 122, and the exclusion for the area for update 120 has been cancelled (Steps S201 to S204).

Figure 9:
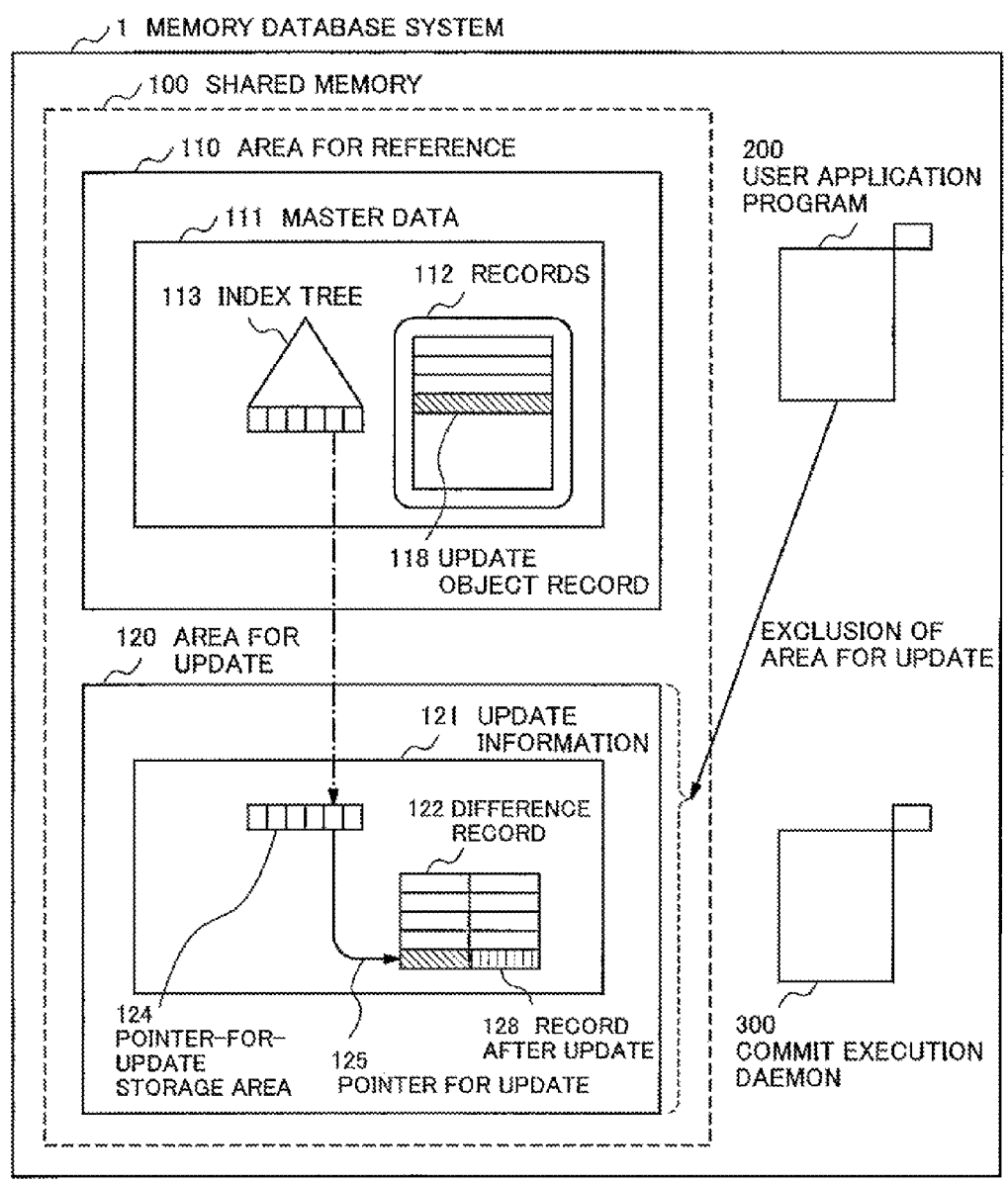
FIG. 9 A configuration diagram of the memory database system according to this exemplary embodiment in an early stage of generating a difference data of the master data by another user.

In this state, when a different user application program 210 tries to update the records 112 anew and requests an update of data, as shown in FIG. 9 (step S210: Yes), the area for update 120 is first excluded, so as not to be referred by the other user application program or the commit execution daemon 300, as shown in FIG. 9 (Step S211).

Figure 10:
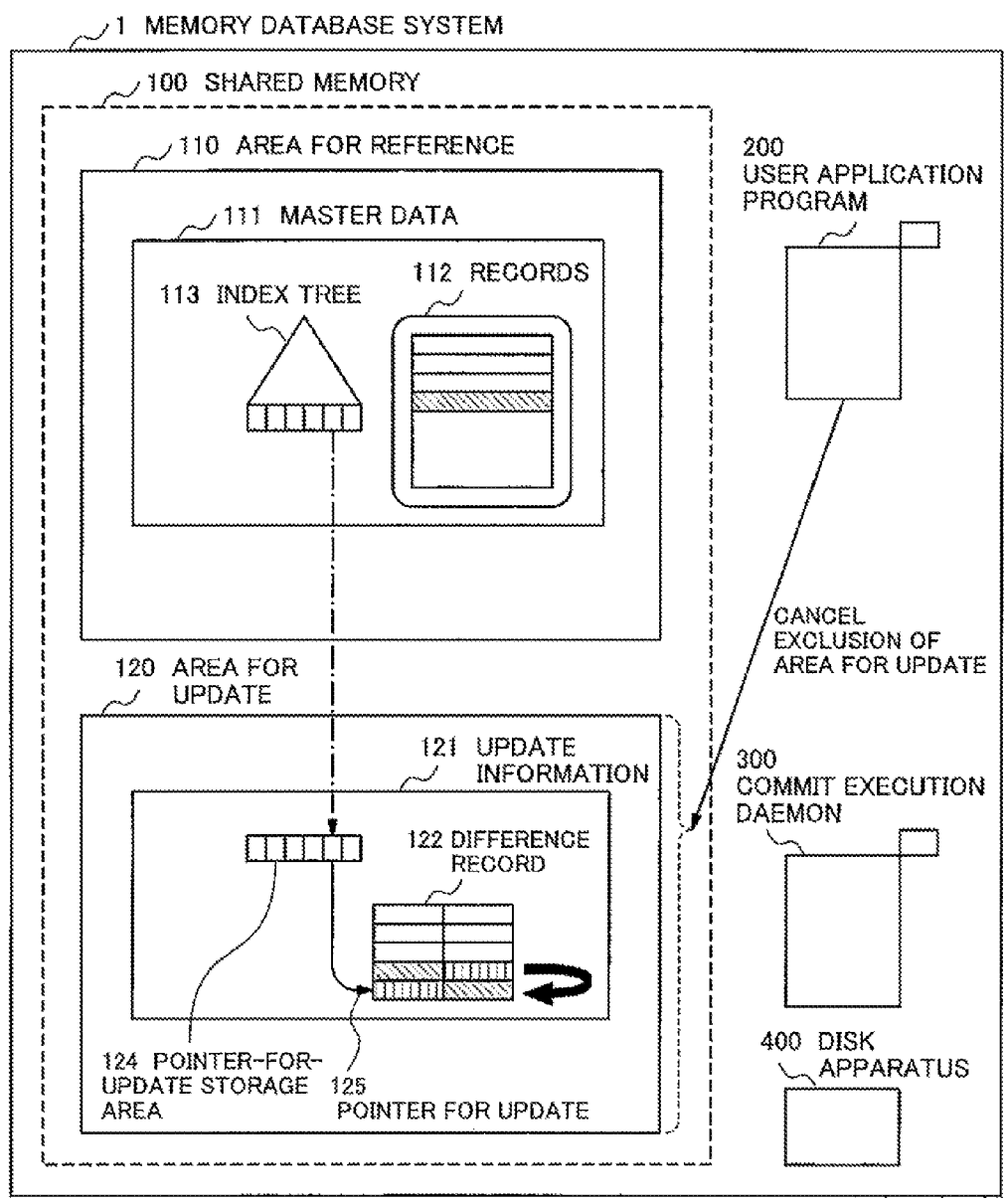
FIG. 10 A configuration diagram of the memory database system according to this exemplary embodiment in a latter stage of generating the difference data of the master data by the another user.

Next, a record to be updated is identified by referring to the pointer for update 125. In this case, the pointer for update 125 points inside the difference record 122, and it is determined that a present real object for update is the record after update 128. After that, as shown in FIG. 10, the different user application program 210 generates a difference record including this record after update 128 (FIG. 9) and also the record after the update of this time (Step S212), and appends it to the area for update 120 (Step S213). Then, the pointer for update 125 is changed, so that the pointer for update 125 points to the generated difference record. After all of the processing ends, exclusion for the area for update 120 is cancelled (Step S214).

Because the reflection processing to the master data 111 by the commit execution daemon 300, after the update by the different user application program 210 ends (step S210: No), is quite similar to the above, description will be omitted.

That is, the commit execution daemon 300, which has received a commit request from the different user application program 210, excludes the area for reference 110 and the area for update 120, reflects the difference record 122 accumulated in the area for update 120 into the master data 111 of the area for reference 110 at the same time, rewrites the master data 111 with the difference record 122, and then eliminates the difference record 122, rewrites the pointer-for-update storage area 124, and then cancels the exclusion for the area for reference 110 and the area for update 120.

When all of the updates for the database are finished, the master data 111 of the area for reference 110 is written into the disk apparatus 400. The master data 111 may be overwritten or may be appended to the master data of the disk apparatus 400. After that, the area for reference 110 and the area for update 120 are deallocated from the shared memory 100, and the processing ends.

Next, a processing, in the case that while the user application program 200 tries to update the master data 111, the different user application program 210 refers to the master data 111, will be described.

Figure 11:
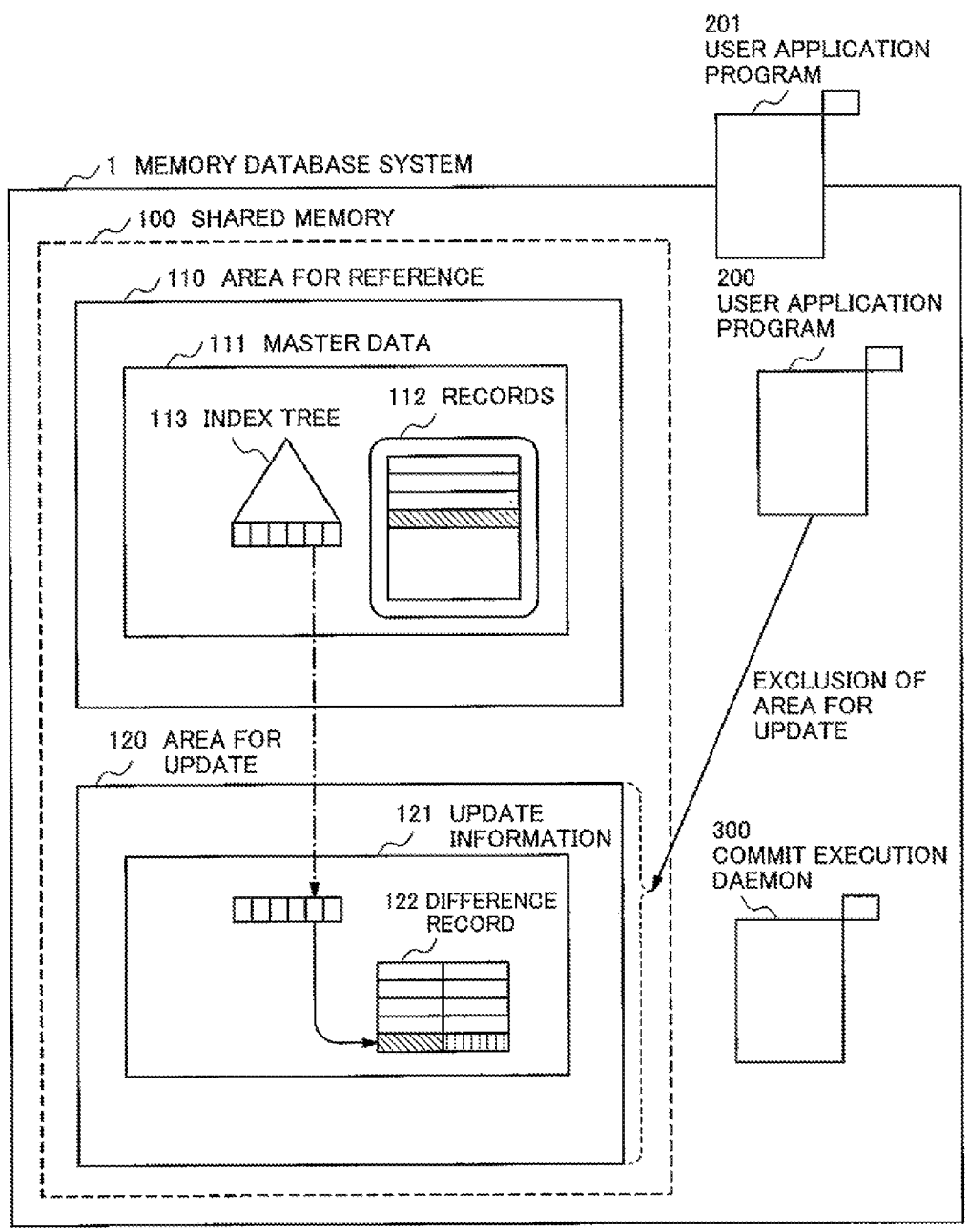
FIG. 11 A configuration diagram of the memory database system according to this exemplary embodiment at the time of referring to an area for reference during generating a difference data of the master data.

While the user application program 200 tries to update the master data 111, the area for update 120 is excluded, as shown in FIG. 11, and thus other user application programs or the commit execution daemon 300 cannot refer to the area for update. However, because data has not been updated in the area for reference 110 and exclusion is not necessary, other user application program can always refer to the area for reference 110.

In this regard, however, both of the area for reference 110 and the area for update 120 are excluded while the commit execution daemon 300 reflects the update information 121 in the master data 111 after the update processing of the user application program 200 completes and a commit request is issued to the commit execution daemon 300. For this reason, any user application program cannot refer to the master data 111.

Of course, it is needless to say that, when no user application program has updated the master data 111, any user application program can refer to the master data 111.

In the database system according to this exemplary embodiment, a function that "same" data can be read and write "simultaneously" and "consistently" is secured for the plurality of user application programs.

A function to protect data from a failure is also required for the database system.

Figure 12:
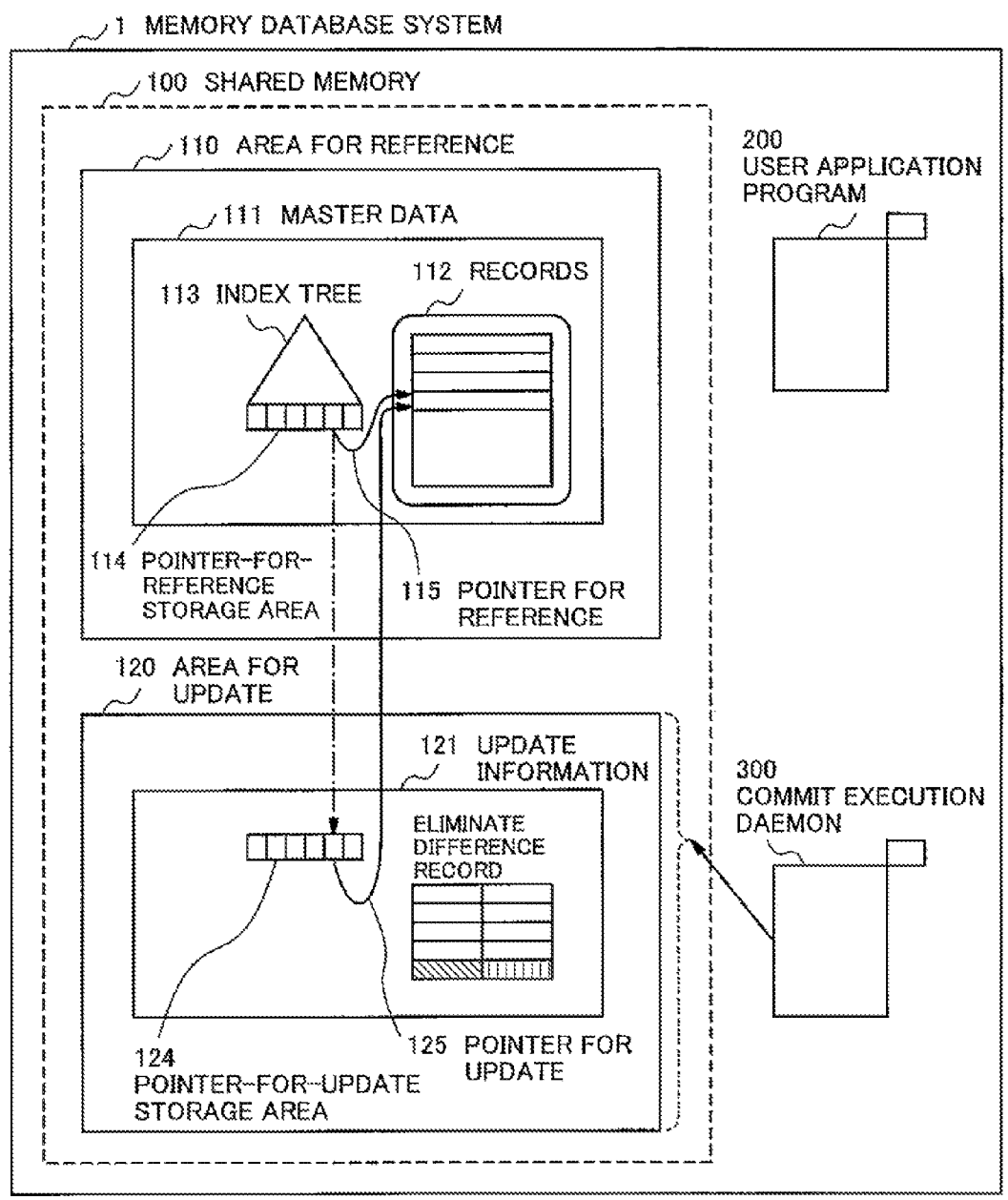
FIG. 12 A configuration diagram of a memory database system according to this exemplary embodiment at the time of data restoration.
Figure 13:
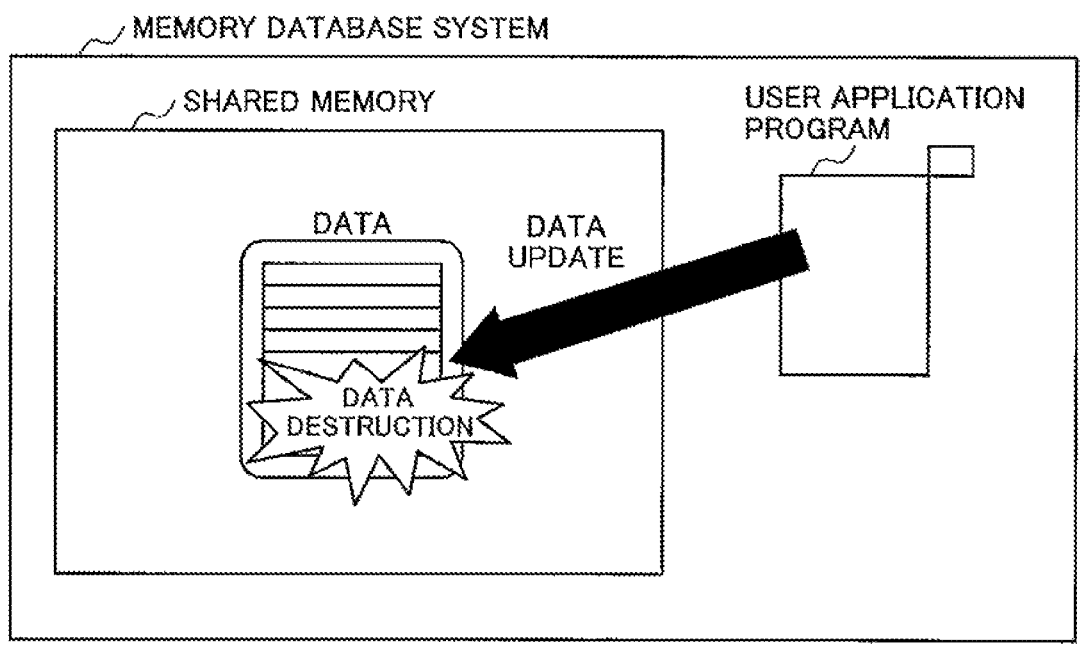
FIG. 13 A configuration diagram of a memory database system at the time of data destruction in the related art.
Figure 14:
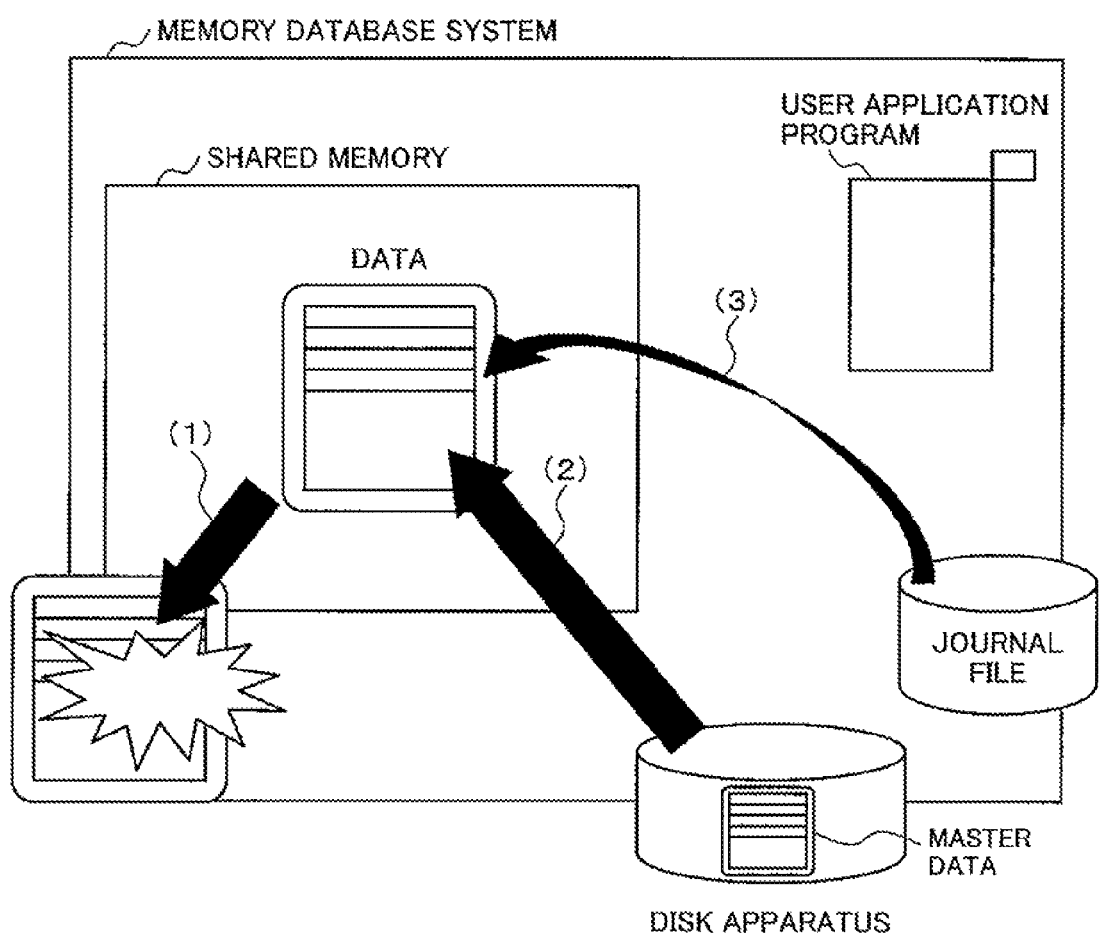
FIG. 14 A configuration diagram of a journal file system at the time of data restoration in the related art.
Figure 15:
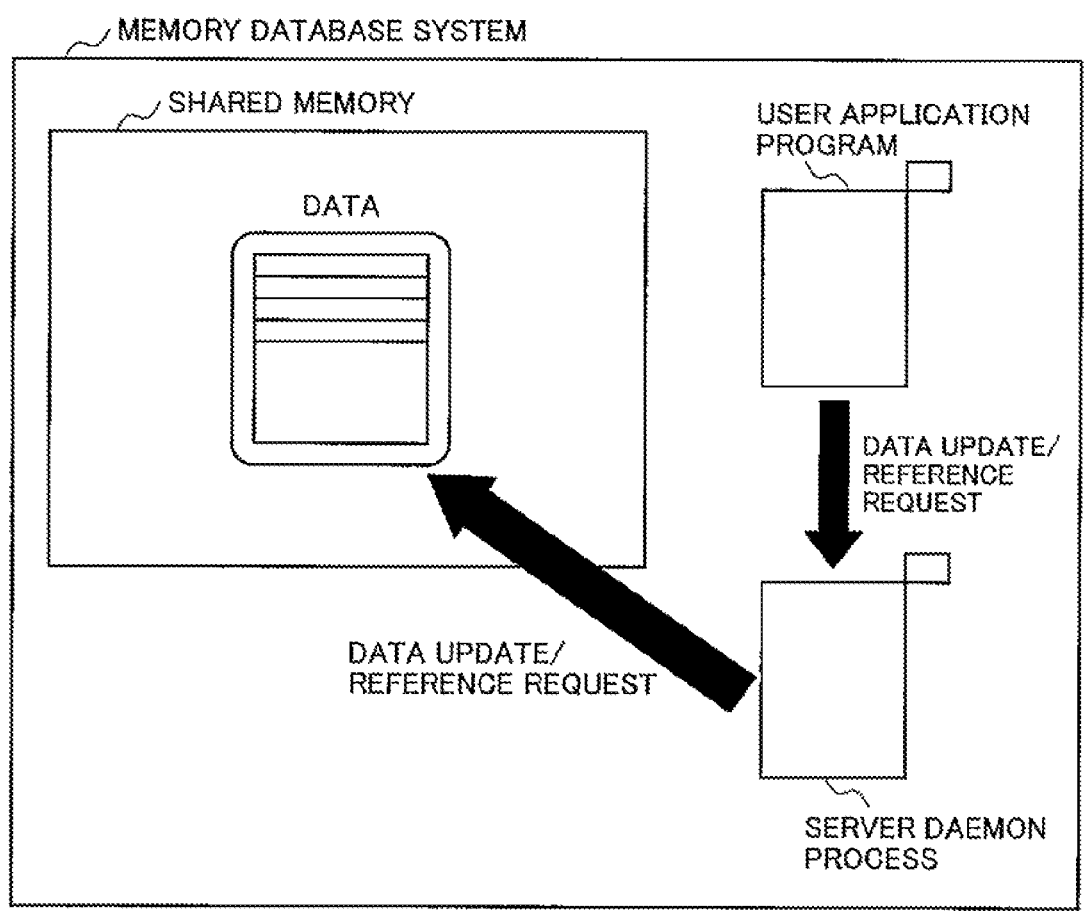
FIG. 15 A configuration diagram of a memory database system of a client/server method in the related art.
Figure 16:
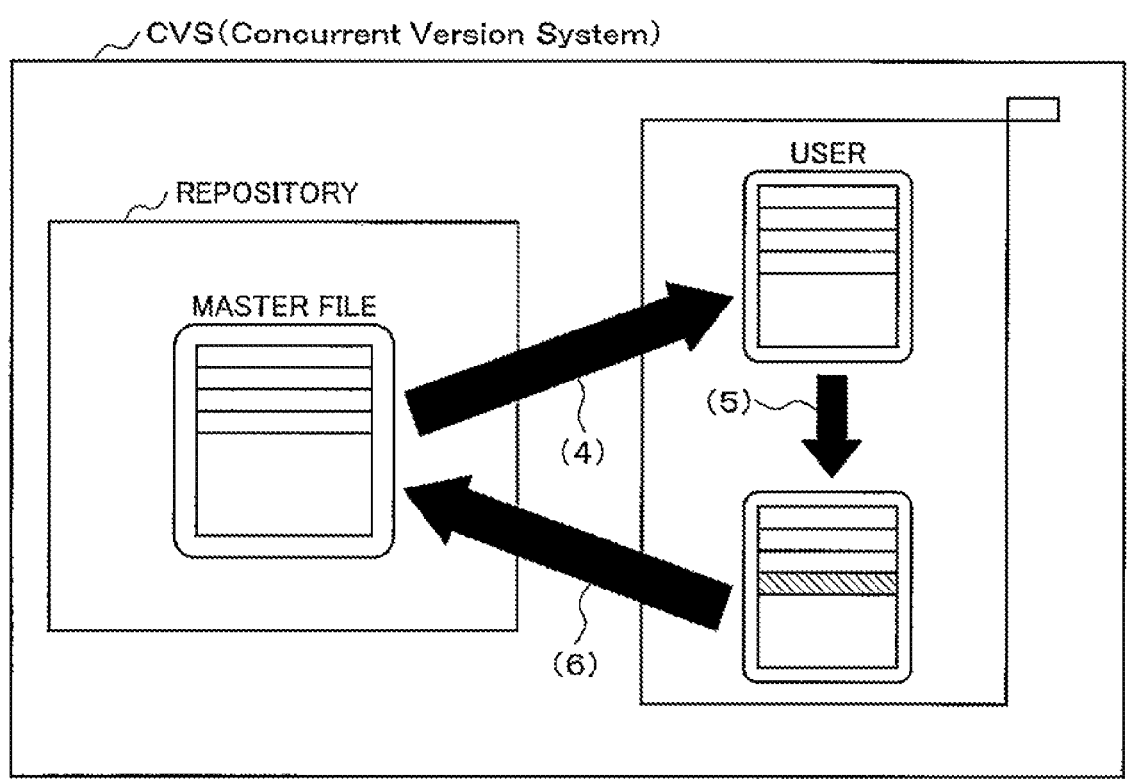
FIG. 16 A configuration diagram of a memory database system of CVS method in the related art.
Figure 17:
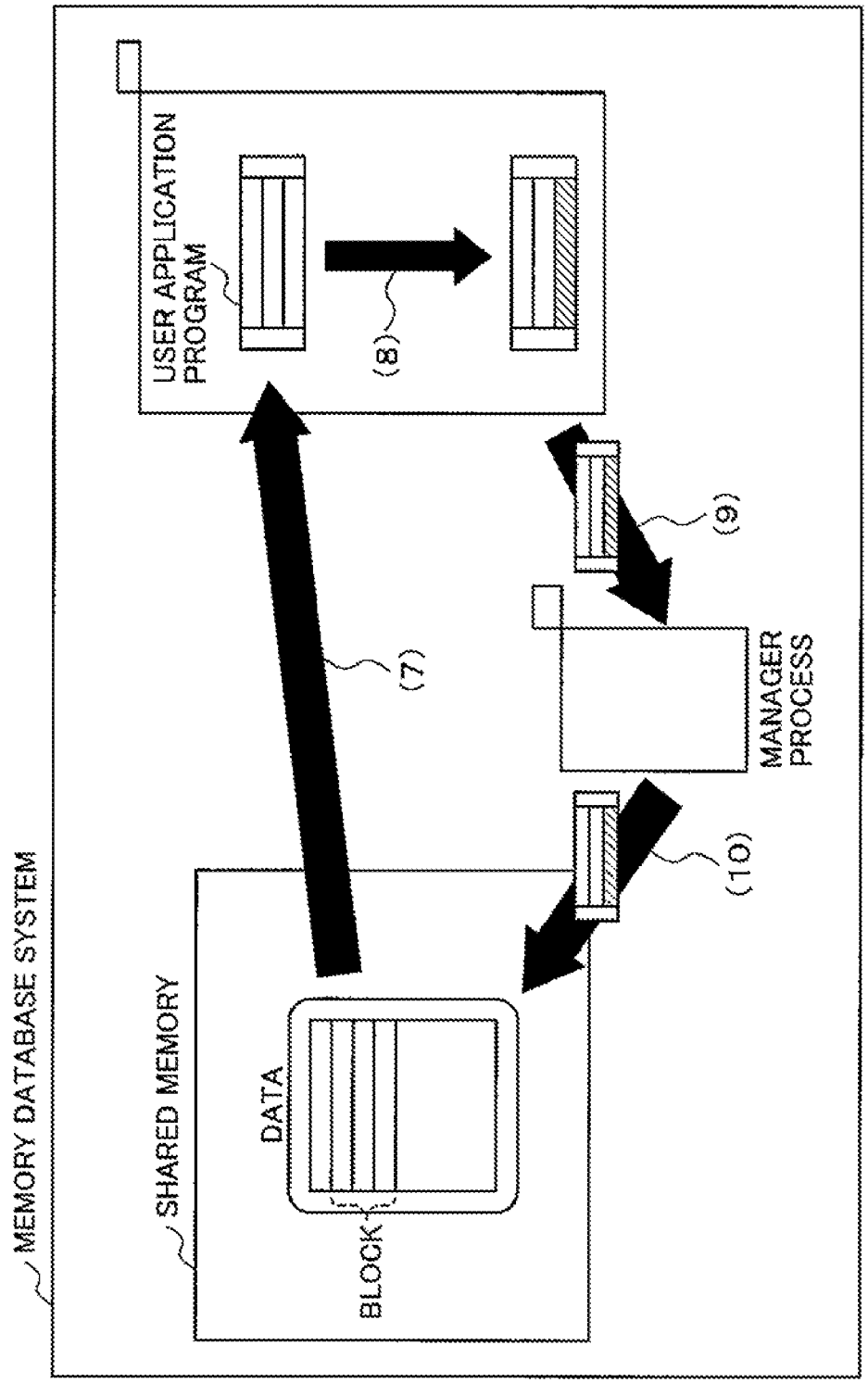
FIG. 17 A configuration diagram of a memory database system in patent document 1.

Referring to FIG. 12 and FIG. 21, a processing for restoring data on the shared memory 100, in case that a memory destruction occurs due to a defect of the user application program 200, will be described.

In the case that the memory destruction occurs due to the defect of the user application program 200, a memory area, which would be destroyed, is restricted to a memory, which the user application program itself has (referred to as a local memory), and to the area for update 120 within the shared memory 100 on the memory database system 1. The user application program 200 has an authority for updating the area for update 120. The area for reference 110, for which the user application program 200 does not have the update authority, is not destroyed.

When it is detected that the update information 121 on the area for update 120 was destroyed (step S301: Yes), (1) the area for update 120 is excluded (Step S302), as shown in FIG. 12, (2) all of the difference records 122 are discarded (Step S303), (3) the contents of the pointer-for-reference storage area 114 are copied again in the area for update 120 (Step S304), and the exclusion for the area for update 120 is cancelled (Step S305). By the above, it is possible to return to the latest committed data status promptly.

During this period, because the area for reference 110 is neither updated nor excluded, any user application program can refer to the master data 111.

As a method for detecting that the update information was destroyed, there is a method, in which a checksum of update information is calculated at the time of generating the update information and the calculated numerical value is stored, and next, when the update information is referred to, the checksum is calculated again to be compared with the stored numerical value.

The process for detecting destruction may be performed by the user application program 200 or by the commit execution daemon 300, or a process for detecting data destruction may be prepared newly.

Thus, according to the memory database system 1 of this exemplary embodiment, the shared memory 100, in which data is arranged, is divided into the area for reference 110, which the user application program 200 is allowed only to refer to, and the area for update 120, which the program is allowed to refer to and update. As a result, even if there exists a defect, which destroys the memory in the user application program, it is possible to localize an influence of the data destruction only into the update information 121 on the area for update 120, for which the user application program 200 has an update authority.

Even if the memory destruction occurs, the master data 111 is preserved in the area for reference 110. For this reason, only by discarding all of the update information 121 on the area for update 120 and by rewriting a reference destination of the pointer for update 124, it is possible to recover to the latest committed data state.

As a result, compared with the restoration procedure in the related technology, i.e. (1) cancelling data on a memory, (2) reloading data from a disk apparatus and (3) roll forwarding from a journal file, a procedure for the disk access becomes unnecessary in this exemplary embodiment. For this reason, a time required for data recovery is reduced substantially.

According to this exemplary embodiment, although the memory destruction is assumed to be localized as mentioned above, an interprocess communication, which causes overhead, is limited to a commit request from the user application program 200 to the commit execution daemon 300. Because, in the other communications, the user application program 200 directly accesses the shared memory 100, degradation in the data access performance is minimized, and the transaction performance improves.

Copying master data to a memory at every data update, such as in the related art, is not performed. As only generation of difference data is performed, consumption of the CPU resource and the memory resource is minimized.

In the related art, data cannot be referred to during the data being updated by a user application program. However, according to this exemplary embodiment, the area for reference 110 is excluded only during the commit processing being executed by the commit execution daemon 300. As the area for reference 110 is not excluded during the data update, a period, where the data reference is impossible, is restricted.

By the above, a possibility for the user application program performing data reference to wastefully consume processing time due to waiting for exclusion, is reduced, and an efficiency for processing data improves.

As it has been described above, according to a memory database according to this exemplary embodiment, the area for reference (a first area), to which a user application program can only refer, and an area for update (the second area), which the user application program can refer to and update, are provided in a shared memory area. If a master data is stored in the area for reference, the user application program cannot access the area for reference, which stores the master data. As a result, the master data is not destroyed by a defect of the user application program.

Furthermore, a memory database according to this exemplary embodiment includes a commit execution daemon capable of referring to and of updating both of the area for reference and the area for update. The memory database stores a master data in the area for reference, and stores a difference data, which has updated the master data, in the area for update, wherein the commit execution daemon updates the master data with the difference data. Because a user application program cannot access the area for reference, which stores master data, the master data is not destroyed due to a defect in the user application program.

Moreover, as the user application program can access a shared memory area, degradation of data update performance by an overhead of interprocess communication is prevented. Furthermore, consumption of a CPU resource and a memory resource by the processing of copying the master data itself is suppressed.

The memory database according to the present invention is not limited to the above-mentioned exemplary embodiment. For example, in the above-mentioned exemplary embodiment, a record is exemplified as the main data of the master data, but it may be other concept, to compose a database.

INDUSTRIAL APPLICABILITY

A memory database of the present invention is used for the field for performing a data analysis for, such a massive amounts of customer data or of statistical data.

The invention claimed is:

1. A memory database system, which updates data by an application program, comprising:
   a data storage unit to store a master data; and
   a shared memory area, including:
   a first area to load said master data and to only be referred to by said application program; and
   a second area to store a difference data, which is generated when said application program updates said master data in said first area, and to be referred to and updated by said application program, wherein
   said master data includes a main data and an index for reference for referring to the main data, and wherein
   said difference data includes an index for update, which links to said index for reference and refers to said difference data.

2. The memory database system according to claim 1, further comprising:
   a daemon execution unit to refer to said first and second areas and to update said first and second areas.

3. The memory database system according to claim 2, wherein
   said daemon execution unit reflects said difference data into said master data, and eliminates said difference data.

4. The memory database system according to claim 3, wherein
   when the daemon execution unit reflects said difference data into said master data, said daemon execution unit excludes said first and second areas.

5. The memory database system according to claim 1, wherein
   when said application program updates said master data, said second area is excluded.

6. A database update method for updating data by an application program, comprising:
   updating a master data loaded in a first area, which is only referred to by said application program, and generating a difference data;
   storing the difference data, which is generated when said application program updates said master data, in a second area, which is referred to and updated by said application program;
   reflecting said difference data into said master data; and
   eliminating said difference data, wherein
   said master data includes a main data and an index for reference for referring to the main data, and wherein said difference data includes an index for update, which links to said index for reference and refers to said difference data.

7. The database update method according to claim 6, further comprising:
excluding said second area, before said application program updates said master data; and
cancelling exclusion for said second area, after said application program updates said master data.

8. The database update method according to claim 6, further comprising:
excluding said first and second areas, before reflecting said difference data into said master data; and
cancelling exclusion for said first and second areas, after reflecting said difference data into said master data.

9. The database update method according to claim 6, further comprising:
updating said master data by another application program, before reflecting said difference data into said master data; and
appending a difference of said master data updated by said another application program to said difference data.

10. A memory database system, which updates data by an application program, comprising:
a first area, which loads a master data, and which is only referred to by said application program; and
a second area, which stores a difference data, generated when said application program updates said master data in said first area, and which is referred to and updated by said application program, wherein
said master data includes a main data and an index for reference for referring to the main data, and wherein
said difference data includes an index for update, which links to said index for reference and refers to said difference data.

11. The memory database system according to claim 10, wherein
said difference data is reflected into said master data and said difference data is eliminated by a daemon, which refers to said first and second areas and updates said first and second areas.

12. The memory database system according to claim 11, wherein
said first and second areas are excluded, when said difference data is reflected into said master data by said daemon.

13. The memory database system according to claim 10, wherein
said second area is excluded, when said application program updates said master data.

14. A non-transitory computer-readable data storage medium having stored thereon a computer program that when executed by a computer causes a method to be performed, the method for updating data loaded in a database, the method comprising:
updating a master data loaded in a first area, which is only referred to by said program, and generating a difference data;
storing said difference data in a second area, which is referred to and updated by said program;
reflecting said difference data into said master data; and
eliminating said difference data, wherein
said master data includes a main data and an index for reference for referring to the main data, and wherein
said difference data includes an index for update, which links to said index for reference and refers to said difference data.

* * * * *